US011365526B2

(12) United States Patent
Kaatrasalo

(10) Patent No.: US 11,365,526 B2
(45) Date of Patent: Jun. 21, 2022

(54) STRUCTURE OF A ROTATION DEVICE, AND A CORRESPONDING ROTATION DEVICE, AND A FOREST MACHINE

(71) Applicant: PONSSE OYJ, Vieremä (FI)

(72) Inventor: Tero Kaatrasalo, Vieremä (FI)

(73) Assignee: PONSSE OYJ, Vierema (FI)

( * ) Notice: Subject to any disclaimer, the term of this patent is extended or adjusted under 35 U.S.C. 154(b) by 673 days.

(21) Appl. No.: 16/197,311

(22) Filed: Nov. 20, 2018

(65) Prior Publication Data

US 2019/0119885 A1    Apr. 25, 2019

Related U.S. Application Data

(63) Continuation-in-part of application No. PCT/FI2017/050397, filed on May 26, 2017.

(30) Foreign Application Priority Data

May 25, 2016   (FI) ..................................... 20165437

(51) Int. Cl.
    *E02F 9/22*       (2006.01)
(52) U.S. Cl.
    CPC .......... *E02F 9/2271* (2013.01); *E02F 9/2275* (2013.01)
(58) Field of Classification Search
    CPC ...... E02F 9/2275; E02F 3/3681; E02F 9/2271
    See application file for complete search history.

(56) References Cited

U.S. PATENT DOCUMENTS 4,009,643 A    3/1977  Thumm
4,333,676 A *  6/1982  Thumm ................. B66C 13/08
                                              294/68.23
(Continued)

FOREIGN PATENT DOCUMENTS

CN    1104282 A    6/1995
CN    2543238 Y    4/2003
(Continued)

OTHER PUBLICATIONS

Supplementary European Search Report in corresponding European Patent Application No. 17802263, date of completion of search Apr. 23, 2020, 3 pages.

(Continued)

*Primary Examiner* — F Daniel Lopez
(74) *Attorney, Agent, or Firm* — FisherBroyles, LLP; Robert Kinberg

(57) ABSTRACT

A rotation device arrangement includes a structure and a suspension part for suspending the rotation device from a boom. The structure includes a first inner body part and first conduits for leading a pressure medium through the first inner body part. A second outer body part is arranged at least partly around the first inner body part completely rotatably. First connections are fitted for leading the pressure medium through the second outer body part. Second conduits are fitted to at least one of an outer surface belonging to the first inner body part and an inner surface belonging to the second outer body part for leading the pressure medium from the first conduit to the first connections. A bearing is arranged to permit the second outer body part to rotate and to carry loads axially and radially. Second connections attach a direct-drive pressure-medium operated turning device to the structure coaxially to transmit torque.

20 Claims, 13 Drawing Sheets

(56) References Cited

U.S. PATENT DOCUMENTS

| | | | |
|---|---|---|---|
| 5,632,625 A | 5/1997 | Faust | |
| 5,908,060 A | 6/1999 | Fargeot | |
| 6,578,296 B2 * | 6/2003 | Kimoto | E02F 9/2267 |
| | | | 37/443 |
| 7,066,076 B2 * | 6/2006 | Roy | A01G 23/003 |
| | | | 414/738 |
| 7,311,489 B2 * | 12/2007 | Ekman | E02F 3/3681 |
| | | | 414/723 |
| 7,735,530 B1 | 6/2010 | Riha et al. | |
| 10,214,874 B2 | 2/2019 | Harr | |
| 2005/0105240 A1 | 5/2005 | Jonsson | |

FOREIGN PATENT DOCUMENTS

| | | | |
|---|---|---|---|
| CN | 2548986 Y | 5/2003 | |
| DE | 3113263 A | 10/1982 | |
| EP | 2159411 A1 | 3/2010 | |
| EP | 2234213 A1 | 9/2010 | |
| EP | 2460758 A1 | 6/2012 | |
| FI | 123051 B | 10/2012 | |
| FR | 2501823 A1 | 9/1982 | |
| KR | 1020090110466 A | 10/2009 | |
| RU | 2515637 C2 | 5/2014 | |
| WO | 9402405 A1 | 2/1994 | |
| WO | 9637930 A1 | 11/1996 | |
| WO | 99/37136 A1 | 7/1999 | |
| WO | 03/057615 A1 | 7/2003 | |
| WO | 03/068655 A1 | 8/2003 | |
| WO | 2012/067559 A1 | 5/2012 | |
| WO | 2012134370 A1 | 10/2012 | |
| WO | 2014/133399 A1 | 9/2014 | |

OTHER PUBLICATIONS

Russian Search Report in corresponding Russian Patent Application No. 2018144353, date of actual completion of the search Jun. 25, 2020, 4 pages with English Translation.

Search Report of Finland Patent Application No. 20165437 dated Dec. 19, 2016.

International Preliminary Report on Patentability of PCT/FI2017/050397 completed Oct. 8, 2018.

International Search Report of PCT/FI2017/050397 dated Sep. 18, 2017.

Written Opinion of the International Searching Authority of PCT/FI2017/050397 dated Sep. 18, 2017.

Reply to the Written Opinion dated Sep. 18, 2017, of PCT/FI2017/050397.

Chinese Notification of the First Office Action in corresponding Chinese Patent Application No. 201780032018.1, dated Sep. 3, 2019, 17 pages with English translation.

Swedish Search report in corresponding Swedish Patent Application No. 1851651-8, dated Oct. 30, 2019, 9 pages.

Crosby, Coastal Logging, Timber/West, Jan. 2021, vol. 26 Number 1, 4 pages.

* cited by examiner

STRUCTURE OF A ROTATION DEVICE, AND A CORRESPONDING ROTATION DEVICE, AND A FOREST MACHINE

CROSS-REFERENCE TO RELATED APPLICATIONS

This application is a Continuation-In-Part Application of International Patent Application No. PCT/FI2017/050397, filed May 26, 2017, which claims the benefit of Finland Patent Application No. 20165437, filed May 25, 2016, the disclosure of each are incorporated herein by reference in its entirety.

FIELD OF THE INVENTION

The invention relates to the structure of a rotation device, which includes an inner body part comprising first conduits fitted to the inner body part for leading a pressure medium through the inner body part, an outer body part, arranged at least partly around the inner body part completely rotatably, comprising connections fitted to the outer body part for leading the pressure medium through the outer body part, second conduits, fitted to either the outer surface belonging to the inner body part or to the inner surface belonging to the outer body part or to both, for leading the pressure medium in all the mutual attitudes of the inner body part and the outer body part from the first conduit to the connections, an axial conduit for leading electrical conductors through the inner body part and comprising two ends, bearing arranged to permit the outer body part to rotate relative to the inner body part and vice versa, which bearing is arranged to carry loads both axially and radially.

The invention also relates to a corresponding rotation device and to a forest machine.

BACKGROUND OF THE INVENTION

The invention relates to rotation devices and their structures, particularly to the rotation devices used in forest machines or in work machines. In particular, the invention relates to a rotation device and its structure, to be used between the boom and harvester head in a forest machine.

At present, the rotation devices used in forest machines mainly use vane-operated hydraulic motors. One such is disclosed in publication EP 2460758 B1. In known solutions, the hydraulic hoses going to the harvester head are taken outside from the boom or the end of the boom to the rotation device or harvester head. Taking the hydraulic hoses to the rotation device or harvester head restricts the rotation of the rotation device, and thus the harvester head, due to the limited length of the hydraulic hoses, because the hydraulic hoses must rotate along with the rotation of the harvester head.

A rotation device, in which a feed-through is formed for feeding through an electric cable, is known from publication EP 2460758 B1. A drawback of this construction is that the rotation device does not, however, freely or unlimitedly rotate, as the hydraulic flow is not taken through the rotation device, but instead the hydraulic hoses are attached directly to the harvester head. An additional problem in the solution of the publication is that the hydraulic hoses run externally from the boom to the harvester head or operating device, which limits the rotational movement of the harvester head relative to the boom and exposes the hydraulic hoses and their connections to external impacts and stresses. In practice, the maximum rotational angle of the harvester head is limited, due to the limited length of the hydraulic hoses. In addition, the structure of the rotation device is high, large, and heavy. All the problems referred to above make the rotation device impractical to use and its structure liable to damage.

In addition, publication WO9937136, which discloses a completely rotating rotation device, in which both the hydraulics and the electric conductors can be led through the rotation device, is known from the prior art. In this construction, the turning device of the rotation device is, however, integrated in the side of the rotation device and rotates the body parts of the rotation device relative to each other as a side drive. It is therefore very difficult to adapt the structure to be compatible with components from different manufacturers, thus confining the user of the structure of the rotation device to one component supplier.

SUMMARY OF THE INVENTION

The invention is intended to create a better structure for a rotation device than rotation device structures according to the prior art, which permits the pressure-medium flow and the electric conductors to be fed through the rotation device, the free rotation of the rotation device, and the modularity of the structure so that the structure can be combined with the turning devices, bearings, and CAN adapters of different manufacturers.

The invention is also intended to create a better rotation device than rotation devices according to the prior art, which permits the pressure-medium flow and the electric conductors to be fed through the rotation device, the free rotation of the rotation device, and the modularity of the structure so that the structure can be combined with the turning devices, bearings, and CAN adapters of different manufacturers. The invention is also intended to create a better forest machine than forest machines according to the prior art, which permits the pressure-medium flow and the electric conductors to be fed through the rotation device, the free rotation of the rotation device, and the modularity of the structure so that the structure can be combined with the turning devices, bearings, and CAN adapters of different manufacturers.

This intention can be achieved by means of a rotation-device structure, which includes an inner body part comprising first conduits fitted to the inner body part for leading a pressure medium through the inner body part, an outer body part fitted at least partly around the inner body part completely rotatably, comprising connections fitted to the outer body part for leading the pressure medium through the outer body part and second conduits fitted either to the outer surface belonging to the inner body part or to the inner surface belonging to the outer body part or to both, for leading the pressure medium from the first conduits to the connections in all the mutual attitudes of the inner body part and the outer body part. In addition, the structure includes an axial conduit comprising two ends for taking the electric conductors through the inner body part and bearing arranged to permit the rotation of the outer body part relative to the inner body part and vice versa, which bearing is arranged to carry loads in axially and radially. The structure further includes connections for connecting a direct-drive pressure-medium operated turning device coaxially relative to the axis of rotation between the inner body part and the outer body part to the structure in order to transmit torque, in which structure the end of the axial conduit on the turning device's side arranged to be attached to the structure is coaxial relative to the essentially common axis of rotation between the inner body part and the outer body part in order to bring the electric conductors through the turning device attached to the structure. The inner body part is a floating structure in the direction of the axial conduit.

With the aid of the structure according to the invention, both the pressure-medium flow and the electric conductors can be taken through the rotation device in such a way that the rotation device can be freely rotated completely. In other words, the said pressure-medium hoses and electric conductors coming from the boom to the rotation device are attached to the non-rotating upper part relative to an essentially vertical axis of the boom carrying the rotation device, and the separate other pressure-medium hoses and electric conductors and other, for example, additive hoses, which are not physically attached to the upper pressure-medium hoses and electric conductors are connected to the rotation device's rotating lower part, and are connected by means of the rotation device to the harvester head or other similar tool attached to the boom. The axial conduit formed in the structure permits electric conductors to be taken through the rotation device attached to the structure, whereas the first conduits, connectors, and second conduits for their part permits the pressure-medium flow to be taken through in all the mutual attitudes of the inner body part and outer body part of the rotation device's structure. By leading the electric conductors to the structure through the rotation device attached in a direct lead with the aid of connections, turning devices of different manufacturers can be combined with the structure, as the rotation shafts of the turning devices are generally hollow. The sides of the structure then remain free, permitting the use of different bearing, such as, for example, a ring bearing, in connection with the structure.

The turning device preferably includes a coaxial passage used to feed axial conduit at least partly through the turning device.

The floating inner body part is arranged to transmit torque only around the axial conduit and is free to move in the length direction of the axial conduit. When during use the bearing is worn, excess play is created. However, in the structure of the present invention this play does not affect the seals between inner body part and the outer body part since the inner body part is a floating structure in the direction of the axial conduit. In other words, the floating inner body part transmits torque around the axial conduit i.e ., in the tangential direction of the axial conduit.

The suspension devices belonging to the structure are preferably attached to the outer body part, in order to suspend the rotation device's structure from the boom. It is then simple to fit a standard motor under the coaxially arranged inner and outer body parts, even though the adapter permitting rotation is on the under-surface of the motor. Unlike the hydraulic connections, the electrical supply/data transfer permitting rotation needs little space radially and the electrical conductors can be brought to the adapter in a relatively narrow conduit.

The inner body part and the outer body are preferably mutually radial. In this connection, radiality means that the parts nest in the direction of the radius.

Preferably the connections for connecting a direct-drive pressure-medium operated turning device are arranged to connect the turning device coaxially relative to the axis of rotation between the inner body part and the outer body part to the structure outside the outer body part in order to transmit torque. This makes it possible to use turning devices of different manufacturer when the turning device is not formed inside of the structure.

Preferably the second end of the axial conduit comprises a first fluting transmitting torque in cross-direction of the axial conduit and permitting motion in direction of the axial conduit between the inner body part and the turning device arranged to be attached to the structure. This enables the inner body part to move in relation to the outer body part when the bearing becomes worn and play is created in the bearing suspending the outer body part from the suspension part. In this application term "spline" can also be used instead of "fluting".

Preferably the structure comprises a second fluting between the suspension part and the inner body part for transmitting torque in cross-direction of the axial conduit and permitting motion in direction of the axial conduit between the inner body part and the suspension part. This also enables the inner body part to move in relation to the outer body part when the bearing becomes worn and play is created in the bearing suspending the outer body part from the suspension part.

The height of the second fluting in direction of the axial conduit is 10-25%, preferably 15-20% of the width of the inner body part. This enables relative small radial play of the second fluting to permit the inner body part to tilt in relation to the suspension part in order to avoid any stresses to the seals between the inner body part and the outer body part when the bearing is worn.

According to an embodiment the inner body part includes a radial extension protruding from the inner body part and the suspension part further includes a support surface for supporting the inner body part from the radial extension on the support surface.

According to an embodiment the connections of the outer body part are arranged to lead the pressure medium through the outer body part in radial direction of the axial conduit. This enables the turning device of the rotation device to be attached below the outer body part in the rotation device's operating position.

Preferably the axial conduit is fixed to the inner body part wherein the second end of the axial conduit forms a power transmission shaft extending from the inner body part for transmitting torque between the inner body part and the turning device arranged to be attached to the structure. The power transmission shaft enables rotational torque to be transmitted from the turning device attached below the outer body part to the inner body part.

In this connection, it should be understood that the said axial conduit is essentially axial, which means that the conduit can also be at a slight angle relative to the axis of rotation between the inner body part and the outer body part.

Preferably, there are at least three first conduits, connections, and second conduits, so that there is at least a pressure line, a return line, and a drain line for the pressure-medium flow, which can be taken separately from each other between the boom and the harvester head.

The axial conduit is preferably coaxial relative to the essentially common axis of rotation between the inner body part and the outer body part. The axial conduit can then be completely straight and coaxial.

In this connection, it should be understood that the first conduits and connections form a group of conduits passing through the structure of the rotation device, which are open/available in all the rotation attitudes of the rotation device. At the same time, it should be understood that the term electric conductor refers to electric conductors that are intended for transmitting one or more voltage, current, or electric signal.

Preferably at least one of the following functionalities: electrical feed-through, bearings, and turning device, are arranged modularly in the structure. Thus, these components of the rotation device can be easily detached and/or changed, i.e. in other words they are not integrated in the structure.

Preferably the inner body part or the outer body part is arranged to be suspended from the boom, so that the other of these is arranged to suspend a harvester head from the rotation device. Instead of a harvester head, some other work device or tool can also be suspended from the rotation device, for example, a grab or other similar device, which must be rotated and for which electrical control and a presser-medium flow must be provided.

The axial conduit is preferably formed of a separate sleeve shaft fitted in the inner body part for taking the electric conductors through the inner body part. With the aid of the sleeve shaft, it is possible to use, in connection with the structure of the rotation device, a pressure-medium operated turning device that is coaxial relative to the axis of rotation of the inner body part and the outer body part, as the sleeve shaft permits the turning device to be placed as a continuation of the inner body part and the outer body part in their longitudinal direction. In addition, the sleeve shaft permits the turning device to be placed after the inner body part and the outer body part, so that the inner body part can be wider, thus permitting the conduits for the feed-through of the pressure-medium flow to be taken to the inner body part without increasing the overall width of the rotation device and with a wide cross-section.

According to one embodiment, the axial conduit is formed as an integrated part of the inner body part. The structure of the rotation device can then be manufactured without separate attachment or locking between the sleeve shaft and the body part, so that the structure is extremely strong and can be made as a single piece either by machining or, for example, as a cast piece.

The connections are preferably arranged to join the said turning device to the outer body part.

According to another embodiment, the sleeve shaft is a separate part to be attached to the inner body part. With the aid of a separate sleeve shaft, the properties of the pressure-medium-operated turning device can vary more, as the sleeve shaft can be manufactured to be compatible with different turning devices without a separate adapter. This in turn increases the considerable modularity of the structure of the rotation device.

According to one embodiment, the second conduits are annular ring conduits formed on the outer circumference of the inner body part.

The structure preferably includes an additional conduit for leading fluid through the structure. Thus the rotation device can be implemented without the hoses needed to lead fluid, which would limit the rotation of the rotation device. The fluid is preferably a tree-stump treatment agent or a lubrication agent for the centralized lubrication equipment, for example, lubricating oil or grease.

The additional conduit is preferably formed either in the outer surface of the inner body part or in the inner surface of the outer body part, or in both. The additional conduit can then be annular, which will permit the transmission of tree-stump treatment agent in all the mutual attitudes of the inner body part and the outer body part.

The pressure medium is preferably hydraulic oil. The operating devices and turning devices of modern harvester heads are generally hydraulic operating devices.

According to one embodiment, the turning device can also be electric, when the power it requires can also be led along the axial conduit using electric conductors.

The connections can be fitted to the outer body part. Thus the pressure-medium-operated turning device can be attached to the outer body part, which is in a rotating relationship with the inner body part.

The bearing is preferably a ring bearing fitted between the inner body part and the outer body part. A ring bearing is easy to change and there are several manufacturers of ring bearings. The ring bearing is arranged to carry axial and radial loads between the inner body part and the outer body part of the rotation device.

A drain line can be formed coaxially around the axial conduit in order to guide leaks in the pressure-medium operated turning device and the operating devices of the harvester head back to the boom through the rotation device. The rotation device can then be implemented without a separate ring line for leaks. In this connection, the term leak refers to an internal leak appearing in the pressure-medium motor, in which the pressure medium moves past the piston to the casing of the pressure-medium motor. This leaked pressure medium should be led out of the casing, so that the pressure in the pressure-medium motor will not grow so large that it could cause internal damage to the pressure-medium motor.

The intention of the invention can be achieved using a rotation device which includes the structure according to the invention, a direct-drive pressure-medium operated turning device to be attached coaxially to the structure relative to the axis of rotation, and an adapter for permitting the complete rotation of the electric conductors attached to the undersurface belonging to the turning device in the operating position of the rotation device. The rotation device according to the invention can be manufactured modularly using the turning devices and ring bearings of different manufacturers, as the structure can be easily adapted according to different manufacturers' components. In other words, each feature and property of the rotation device can be implemented in the best possible manner and with the most suitable components. With the aid of the adapter, the electric conductors can rotate completely.

According to one embodiment, the pressure-medium-operated turning device of the rotation device is a radial piston motor. For example, compared to a vane motor a radial piston motor is more precise to operate when working. The seal in a radial piston motor takes place over a long distance in the jacket of the cylinder, so that its pressure resistance is better than in a vane motor, in which sealing takes place as a linear contact between the vane and the cylinder. Because of this a radial piston motor is more precise to operate and the torque it produces is greater than that of a vane motor.

According to another embodiment, the pressure-medium operated turning device is a vane motor. A vane motor too can be installed to drive directly to the sleeve shaft after the structure, so that the rotation device retains a narrow structure.

The turning device is preferably hydraulic. An even output of power is obtained with the aid of hydraulics.

Alternatively, the turning device can also be electrically operated. An electrically operated turning device requires fewer connections than a hydraulic turning device.

Preferably the rotor of the completely rotating CAN or other similar adapter is arranged to be attached to the axial conduit of the inner body part of the structure thus permitting the conductor to be installed to be stationary. Thus the electric conductor in the axial conduit cannot twist. The rotor of the adapter is attached to the circumferential part of the hydraulic motor. The CAN adapter can also be selected from among the adapters of different manufacturers.

The adapter is inductive, capacitive, galvanic, or a combination of these. The power supply can be, for example, by means of a galvanic connection and the data transfer by means of an inductive connection.

The adapter used can be, for example, Penlink AB's (SE) model "COMPACT SLIP RINGS—SRC025".

The turning device of the rotation device is preferably fitted between the inner body part and the adapter of the electric conductors.

A hydraulic drain line is preferably formed between the structure and the turning device for connecting and leading the hydraulic drain flow coming from the harvester head to the hydraulic drain line of the turning device. This makes it possible to avoid having to form an additional annular conduit in the structure.

In this connection it should be understood that the inner body part and the outer body part can each be elements consisting of one or more components.

The electric conductors and conduits required for the hydraulics, tree-stump treatment agent and the data-transfer buses (CAN/Arcnet buses) can also be taken through the feed-through in the centre of the structure of the rotation device according to the invention to the harvester head. In addition to the data-transfer buses, electrical power/current/voltage supply can also be led to the harvester head. Thanks to the structure according to the invention, the harvester head can be rotated without limit. The structure also permits modularity when forming the rotation device, as using the same structure the rotation device can be assembled without changes, or with at most minor changes, to be compatible with the turning devices, CAN adapters, and rotation rings of different manufacturers. In other words, the rotation device can be implemented using known components and/or commercially available components. The structure according to the invention is a floating structure, so that the loading is not directed to the hydraulics feed-through or the CAN feed-through. In this context, the term floating refers to the fact that the inner body part rests by gravity on top of the turning device and the inner body part can be freely rotated relative to the outer body part and the rotation device's lug. The structure permits the CAN feed-through component to be located under the rotation device. The advantage gained with the structure according to the invention is that the rotation device can be operated without needing to watch out for or allow for hanging connection hoses, and also without the danger of cutting the connection hoses during work when rotating the harvester head. The free rotatability of the rotation device brings with it new working possibilities, accelerates work, and improves productivity. On the other hand, by means of the rotation device according to the invention it is possible to avoid device damage due to the previously limited rotation angle, which can be caused by an inexperienced operator. In its overall dimensions, the structure according to the invention is shorter longitudinally than rotation devices according to the prior art.

In addition to the electric conductors and conduits, pressure-medium lines, for example hydraulic leads, can also be taken through the feed-through in the centre of the structure of the rotation device according to the invention.

In the operating position of the rotation device, the turning device is preferably attached underneath the outer body part of the structure of the rotation device, to the under-surface of the outer body part. The attachment of the turning device is then simple to make and turning devices from different manufacturers can easily be used.

One preferred hydraulic turning device, which can be used with the structure of the rotation device according to the invention to form the rotation device according to the invention, is the turning device marketed under the product name MCR5 or MCR10, manufactured by Bosch Rexroth AG.

In this context, the term direct drive refers to the fact that there is no mechanical transmission between, for example, the turning device and the inner body part, but that the turning device directly rotates the inner body part.

The intention of the forest machine according to the invention can be achieved by means of a forest machine, which includes a structure of a rotation device according to any of the aforementioned embodiments.

The forest machine preferably includes a harvester head. Especially in connection with a harvester head, several pressure-medium flows and possibly also electric conductors need to be taken through the rotation device.

In the rotation device according to the invention, the inner body part and the outer body part together form a completely rotating totality, which distributes the pressure-medium flow from the rotation device. Underneath this totality a standard model coaxial turning device is preferably attached, comprising an opening for taking an axial conduit through the turning device. An adapter is preferably further attached to the under-surface of the turning device, to permit the complete rotation of the electric conductors.

It should be understood that the structure of the rotation device and the rotation device according to the invention can also be used in connection with any work device using a pressure medium, control and/or measurement. In connection with the rotation device according to the invention, besides a harvester head, such work devices can be, for example, a grab saw, a felling grab/device, a stump lifting device, or some other work device suspended from the boom or at the end of the boom. Instead of a boom, the structure of the rotation device according to the invention can also be suspended from some other similar suspension structure.

BRIEF DESCRIPTION OF THE DRAWINGS

In the following, the invention is described in detail with reference to the accompanying drawings showing some embodiment of the invention, in which.

DETAILED DESCRIPTION OF THE INVENTION

Figure 1:
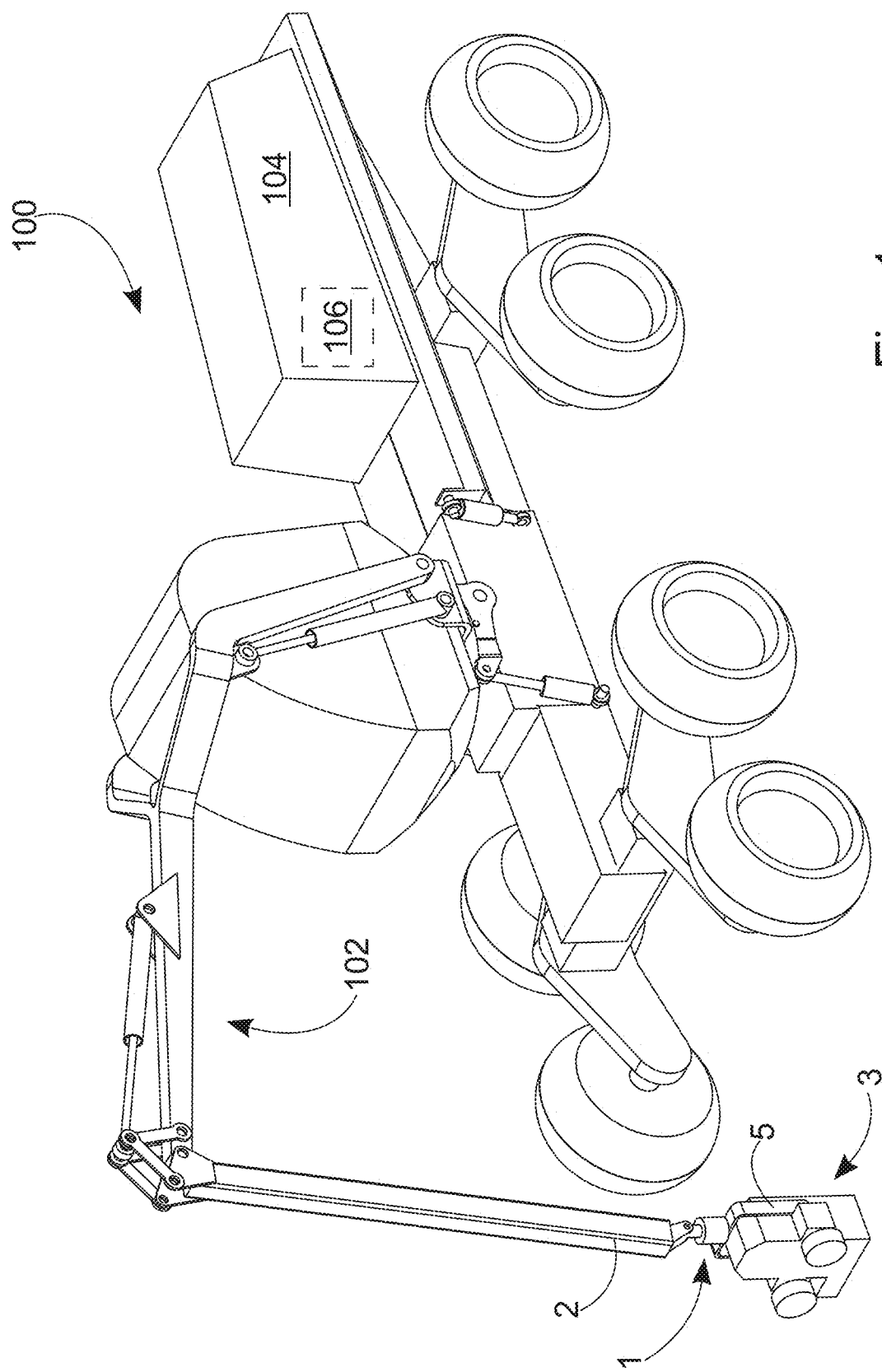
FIG. 1 shows an axonometric simplified schematic image of the rotation device according to the invention in connection with a forest machine.

According to FIG. 1, the rotation device 1 according to the invention is suitable for use preferably in connection with forest machines 100. The rotation device can also be termed a rotator, which is widely used in the field of technology. In forest machines 100, there is generally a set of working booms 102, to the end of the last boom 2 of which the rotation device 1 is attached in a pivoted manner. The pivoting of the rotation device 1 to the boom 2 can be made according to the prior art using two transverse rotating joints at different directions to each other, which permit the rotation device 1 to always hang vertically, irrespective of the attitude of the set of working booms 102. The rotation device 1 can be attached to a shackle 5 belonging to the harvester head 3, which can be rotated unrestrictedly around the axis of rotation of the rotation device 1 with the aid of the rotation device 1. According to the prior art, the pressure-medium flow required by the operating devices of the harvester head 3 is taken through the set of working booms 102 with the aid of hoses, from the forest machine's 100 pressure-medium pump 106, which is operated with the aid of the engine 104 of the forest machine 100 to create pressure. According to FIG. 1, the rotation device 1 according to the invention permits the pressure-medium flows coming from the set of working booms 102 to be taken through the rotation device 1 to the harvester head 3. Correspondingly, the electrical control of the harvester head 3 is also brought from the forest machine 100 by way of the set of working booms 102 through the rotation device 1 to the harvester head 3.

Figure 2:
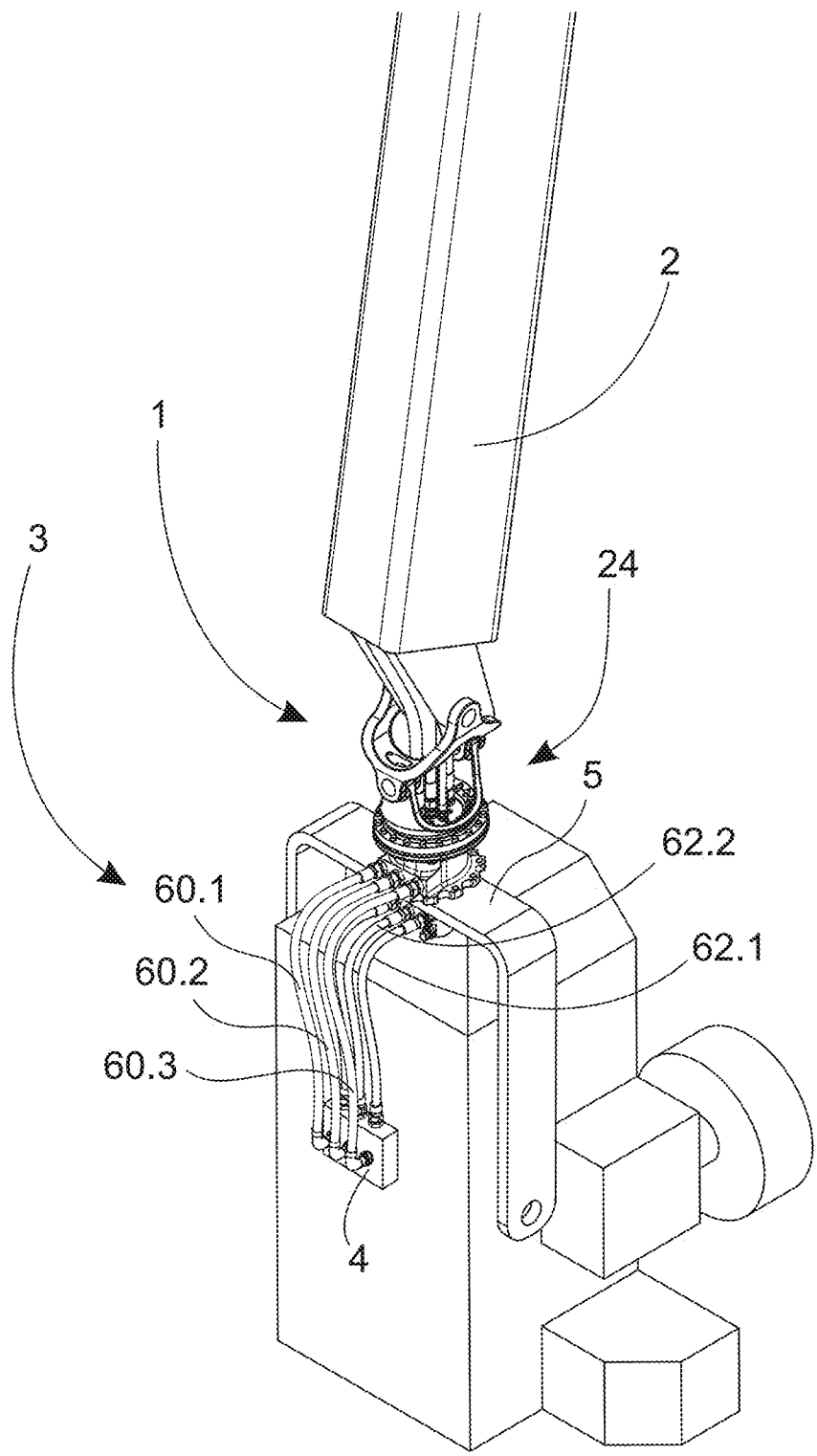
FIG. 2 shows an axonometric rear view of the rotation device according to the invention suspended from a boom and attached to a harvester head.

According to FIG. 2, when using the rotation device 1 according to the invention, the pressure-medium flows taken through the rotation device 1 are led along the lines 60.1-60.3 to the harvester head's 3 valve block 4, from where the flow is further distributed to the harvester head's 3 operating devices and the turning device 24 intended to turn the rotation device 1. The harvester head's operating devices can be, for example, a cutting device's cylinder, the feed motors of the feed rollers, and the stripping claws' cylinders. The rotation device according to the invention is preferably intended to be used in connection with a forest machine, in which the pressure medium is hydraulic oil, but the invention is also suitable for use with pneumatic pressure-medium flows. In this connection, it should be understood that, instead of a forest machine, the rotation device and structure of a rotation device according to the invention are also suitable for use, for example, with excavators and other work machines equipped with a set of working booms, in which a work device, which has operating devices, such as a bucket or grab or something similar, requiring a pressure medium, is attached to the set of working booms.

The leading of the pressure-medium flows from the boom 2 to the rotation device 1, shown in FIG. 2, can be implemented in several ways. The connections of the pressure-medium lines connected to the cover 88 of the rotation device 1 shown in FIG. 7 can be arranged to travel parallel to the axis of rotation of the rotation device and to be at right-angles to the second axis of rotation pivoting the rotation device 1 to the boom. In other words, the connections connecting the lines to the rotator are oriented, according to FIG. 2, upwards, if the connection is examined relative to its longitudinal direction. The lines of the pressure-medium flows, which leave the boom 2, i.e. in this case the end of the boom, preferably travel through the rotating joint between the boom 2 and the rotation device 1 and through its axis of rotation. Alternatively, in their longitudinal direction the connections of the pressure-medium flows can be at an angle of 5-85° relative to the plane of the cover of the rotation device, so that, in other words, the connection of the lines lie at a slanting angle to the cover, most preferably the connection's longitudinal direction intersecting the imaginary axis of rotation of the lower joint of the rotating joints between the rotation device and the boom. Further, alternatively the connections of the lines of the pressure-medium flows can be arranged on the side of the rotation device next to the boom and the lines can travel in the direction of the axis of rotation of the rotating joint on the harvester head side transferred past this rotating joint, i.e. through the first rotating joint, but bypassing the end of the second rotating joint and from there to the connectors fitted to the forest-machine side on the side of the rotation device. The aforementioned are only exemplary ways of leading the pressure-medium flow to the rotation device.

Figure 3A:
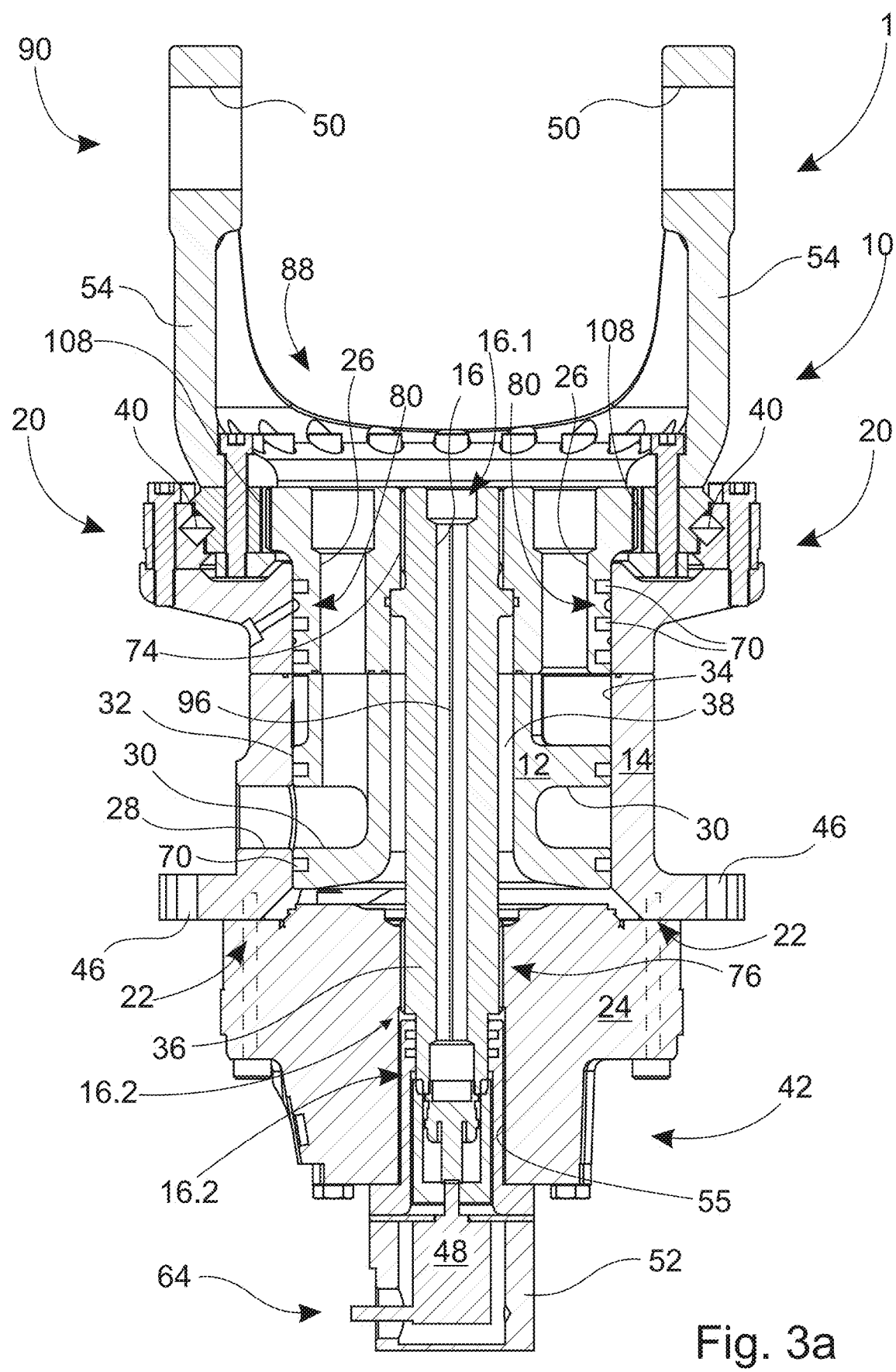
FIG. 3a shows a side cross-section of a first embodiment of the structure and rotation device according to the invention.

FIG. 3a shows a cross-section of a first embodiment of the rotation device 1 and the structure 10 of the rotation device according to the invention. The rotation device 1 according to the invention includes a structure 10 of a rotation device and a turning device 24 attached to it as well as the electric-conductor 96 adapter 48 visible in FIG. 9. The adapter 48 is preferably attached to the under-surface 94 belonging to the turning device 24 (shown in FIGS. 3b and 4b). The turning device 24 is, for its part, preferably attached to the under-surface 92 of the outer body part 14. In this connection, the under-surface is defined, according to the suspension attitude of the rotation device, as the opposite side of the structure of the rotation device to the suspension part. The structure 10 of the rotation device 1 includes, as principal components, an inner body part 12, an outer body part 14, bearing 20, attachment parts 22, an axial conduit 16 comprising two ends, namely a first end 16.1 and a second end 16.2, first conduits 26, second conduits 30, and connections 28. The first end 16.1 includes an electric-conductor holder (not shown). The inner body part 12 is a cylindrical piece, through which the axial conduit 16 of the body part 12 is formed for electric conductors, and first conduit 26 for feeding through a pressure medium. The axial conduit 16 forms a connection at that end of the cylindrical inner body part that is opposite to the turning device 24 attached to the structure of the rotation device 1 and external to the turning device 24. The other end 16.2 of the axial conduit 16 is the end that is at that end of the inner body part 12 to which the turning device is arranged to be attached.

In the embodiments of FIGS. 3a-4b, there are three first conduits 26 for taking three separate pressure-medium flows through the inner body part 12. The first conduits 26 are preferably axial relative to the inner body part 12, i.e. parallel to the axial conduit 16, and each first conduit 26 has two ends. The first of each of the ends of the first conduit 26 forms a connection at the end of the cylindrical inner body part 12 that is opposite to the turning device 24 to be attached to the structure of the rotation device 1. The other end, in turn, forms a connection radially to the side of the inner body part. The first conduits 26 can also be at a slight angle relative to the longitudinal direction of the inner body part 12, when the second ends of the first conduits 26 will form a direct connection to the sides of the inner body part. In FIG. 3a, the left-hand first conduit 26 relative to the axial conduit 16 is a pressure line, while the right-hand first conduit 26 is a return line. The first conduit 26 and the axial conduit 16 can have a diameter of 2-50 mm and be preferably circular in cross-section. The conduits 26 and 16 are preferably 15-30 mm in diameter, for optimal volume flow.

In the embodiments of FIGS. 1-9, the inner body part 12 is intended for suspending the rotation device 1 on the boom 2 of a forest machine with the aid of the suspension part 90 belonging to it. In this embodiment, lugs 54 as the suspension part 90 are formed to the inner body part 12, in which lugs there are in turn openings 50 for pivoting the rotation device 1 to the forest machine's boom 2.

The outer body part 14 also includes its radial connections 28, which are intended to lead the pressure medium from the inner body part 12 through the outer body part 14. There are preferably as many connections 28 as there are first conduits 26. In order for the connections to be connected in all mutual attitudes of the inner nody part 12 and the outer body part 14, that is in all the attitudes (i.e., angular positions of rotation) of the inner body part and the second body part relative to each other, second conduits are formed in the outer surface belonging to the inner body part or the inner surface belonging to the outer body part or in both. In the embodiments of FIGS. 3a-4b, the second conduits 30 are formed in the outer surface 32 of the inner body part 12. The inner surface of the outer body part is shown with the reference number 34. Each second conduit 30 is preferably an annular ring conduit, which permits the flow of the pressure medium irrespective of the mutual attitudes of the inner body part 12 and the outer body part 14. In other words, each second conduit is a continuous annular radial recess in the inner body part, the outer body part, or both. According to FIGS. 3a-4b, there are preferably as many second conduits 30 as there are first conduits 26 and connections 28. Rotating movement seals are preferably formed in the inner body part or the outer body part to prevent leakage of the pressure medium from the second conduit between the inner body part and the outer body part. In the embodiment of FIGS. 3a-4b, rotating movement seals 70 are formed in the inner body part 12.

The outer body part 14 also includes its radial connections 28, which are intended to lead the pressure medium from the inner body part 12 through the outer body part 14. There are preferably as many connections 28 as there are first conduits 26. In order for the connections to be connected in all the attitudes of the inner body part and the second body part relative to each other, second conduits are formed in the outer surface belonging to the inner body part or the inner surface belonging to the outer body part or in both. In the embodiments of FIGS. 3a-4b, the second conduits 30 are formed in the outer surface 32 of the inner body part 12. The inner surface of the outer body part is shown with the reference number 34. Each second conduit 30 is preferably an annular ring conduit, which permits the flow of the pressure medium irrespective of the mutual attitudes of the inner body part 12 and the outer body part 14. In other words, each second conduit is a continuous annular radial recess in the inner body part, the outer body part, or both. According to FIGS. 3a-4b, there are preferably as many second conduits 30 as there are first conduits 26 and connections 28. Rotating movement seals are preferably formed in the inner body part or the outer body part to prevent leakage of the pressure medium from the second conduit between the inner body part and the outer body part. In the embodiment of FIGS. 3a-4b, rotating movement seals 70 are formed in the inner body part 12.

Figure 9:
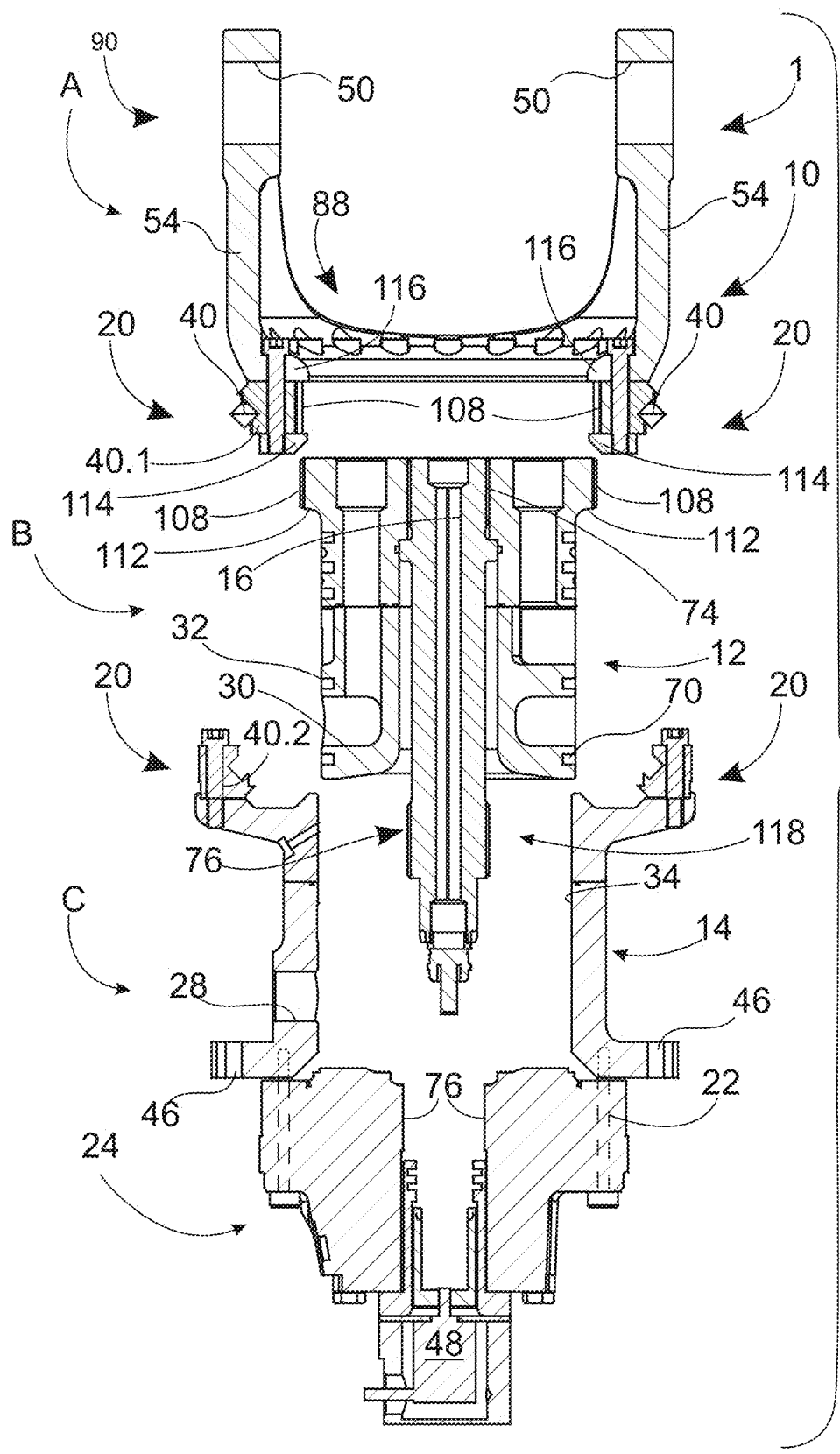
FIG. 9 shows a fourth embodiment in cross-section in two directions.

Attachment parts 22, shown as bolts in FIGS. 3a and 9, are arranged to attach the direct-drive pressure-medium operated turning device 24 to the structure 10 coaxially relative to the axis of rotation of the inner body part 12 and the outer body part 14 for transmitting torque. In this connection, the term direct-drive refers to the fact that power is preferably transmitted directly to the inner body part 12, for example, with the aid of a sleeve shaft 36. The turning device 24 together with the structure 10 forms the rotation device 1 according to the invention. The attachement parts 22 are preferably arranged to connect the turning device 24 to the outer body part 14, so that the turning device 24 is permanently attached to the outer body part 14.

The structure 10 preferably includes a sleeve shaft 36, to which first fluting 76 is formed as power-transmission elements formed. The first fluting is a toothing formed in a ring shape. According to FIGS. 3a and 3b, the sleeve shaft 36 can be a separate shaft penetrating the inner body part 12, in which the said axial conduit 16 is formed. According to FIGS. 3a and 3b, the sleeve shaft 36 can be attached to the inner body part 12 using shape-closing locking, for example, with the aid of second fluting 74 (shown in greater detail in FIG. 8) and transmit the torque of the turning device 24 directly to the inner body part 12, thus rotating the outer body part 14 around the inner body part 12. It is, however, also possible to attach the sleeve shaft 36 to the inner body part using a friction joint, for example a thermal joint. The length of the sleeve shaft 36 can be such that it extends both to the inner body part 12 and at least partly to the distance of the turning device 24 attached to the structure 10. The turning device 24 includes a coaxial passage 55 used to feed axial conduit 16 at least partly through the turning device. The first fluting 76 formed in the sleeve shaft 36 transmits torque between the turning device 24 and the inner body part 12. When the rotation device 1 rotates, the inner body part 12 and the sleeve shaft 36 attached to it remain stationary, while the turning device 24 and the outer body part 14 attached to it rotate. Second connections 78 are formed in the turning-device 24 side end of the sleeve shaft 36, attachment which permit a separate electric-conductor adapter 48 to be attached to the end of the sleeve shaft 36. According to FIGS. 4a and 4b, the sleeve shaft 36 can be formed to be a fixed part of the inner body part 12 (i.e., integrel with the inner body part 12), so that the sleeve shaft 36 is a structure protruding from the inner body part 12, in the centre of which the axial conduit 16 for electric conductors runs.

The axial conduit 16 permits the electric conductors coming from the boom to be taken through the rotation device 1 to the turning-device 24 end 16.2 of the axial conduit 16, at least in the case of the end 16.2 coaxially with the inner body part 12 and through the turning device 24 fitted to the rotation device. So that the electric conductors do not prevent the complete rotation of the rotation device, the electric conductors must be preferably connected to the electric-conductor adapter 48 belonging to the rotation device. The adapter 48 rotates completely in such a way that the electric conductors can be attached rotatably to the upper part of the adapter and electricity is transmitted through the adapter to the connector 64 rotating in its lower part, to which the electric conductors going to the harvester head are attached. The adapter can be any completely rotating adapter whatever on the market. Preferably the electric conductors taken through the rotation device according to the invention are data-transfer buses, preferably a CAN bus or an ArcNet bus, and the adapter 48 is a CAN adapter or correspondingly an Arcnet adapter. With the aid of the CAN bus or ArcNet bus electronic control is taken for the harvester head's functions of its operating devices, measurement sensors, and valve control. The electric conductors can also be more than one. For the adapter 48, the rotation device 1 can also include a protective casing 52, which can be attached to the turning device 24. An adapter connected under the turning device for its part permits a lower and simpler construction than that in rotation device according to the prior art.

The turning device to be used in the rotation device according to the invention is preferably a turning device placed coaxially around the sleeve shaft, so that the axial conduit 16 parallel to the axis of rotation of the rotation device is arranged to extend through the structure and at least partly also to the length of the turning device fitted to the structure. The rotation device can then be implemented in such a way that it does not widen the turning device radially. The turning device 24 used in the rotation device 1 is preferably a hydraulic radial piston motor 42. The advantages of a radial piston motor are its precise usability and long service life, as in it sealing takes place with the aid of the rotating movement of the bearings. Alternatively, the turning device can also be a vane motor, which can also be fitted around the sleeve shaft to provide direct drive.

According to the embodiments of FIGS. 3*a*-4*b*, the structure 10 of the rotator 1 according to the invention can also include an extra conduit 80 formed by extra first conduit 26, a second conduit 30, and a connection 28, for leading fluid through the rotation device 1. The fluid can be, for example, tree-stump treatment prevention agent or a lubrication agent, for example, lubricating oil or grease. The urea generally used as a prevention agent is used in a forest machine for treating the stump in connection with felling a tree. In connection with felling a tree, the tree's stump remains open, when a parasitic infection, for example rot fungus, can easily attack the open timber surface. Rot fungus can spread from the stump's roots to other healthy trees and thus destroy the tree stock.

Figure 3B:
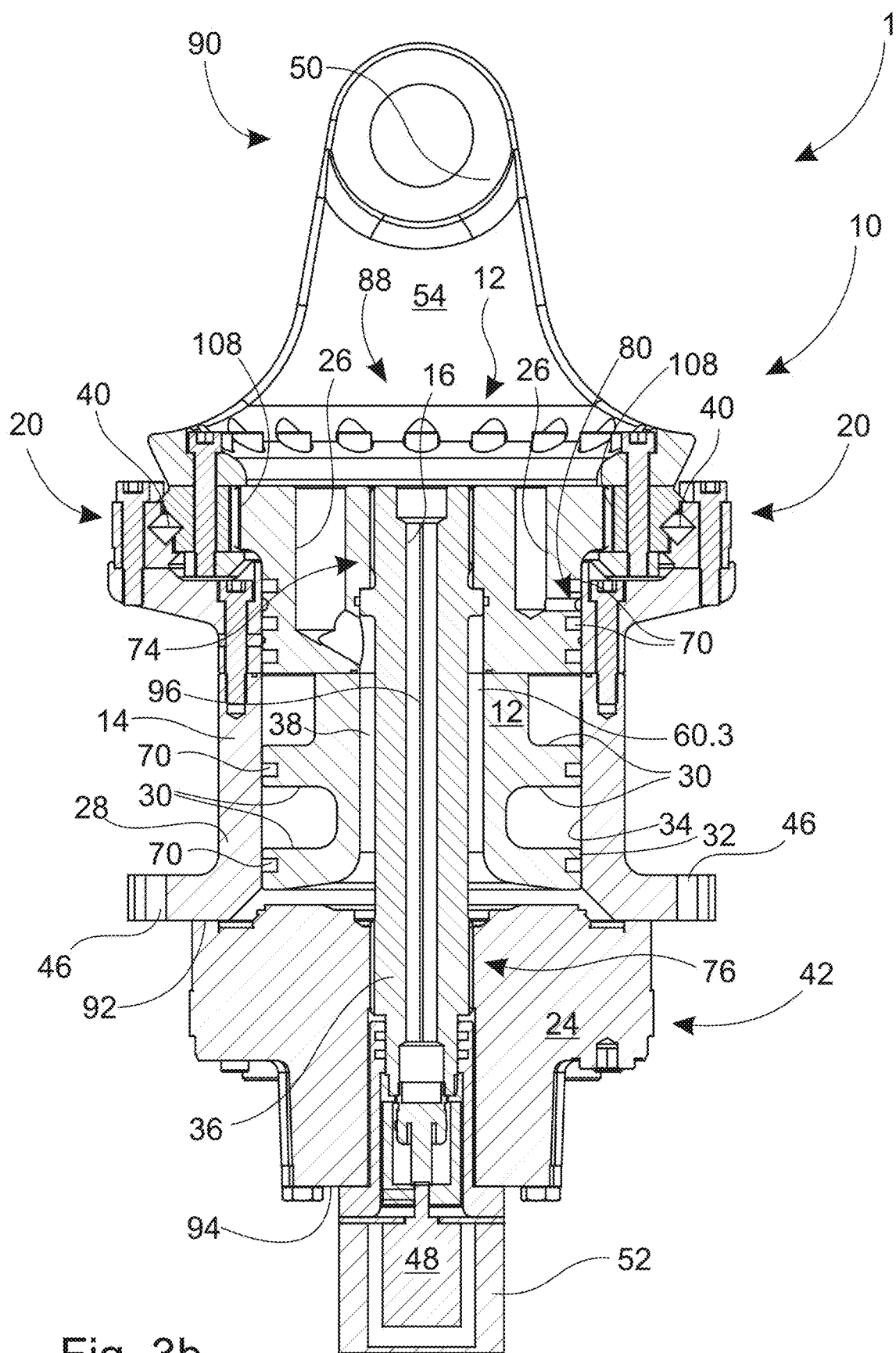
FIG. 3b shows a side cross-section at an angle of 90° relative to FIG. 3a of a first embodiment of the structure and rotation device according to the invention.
Figure 4A:
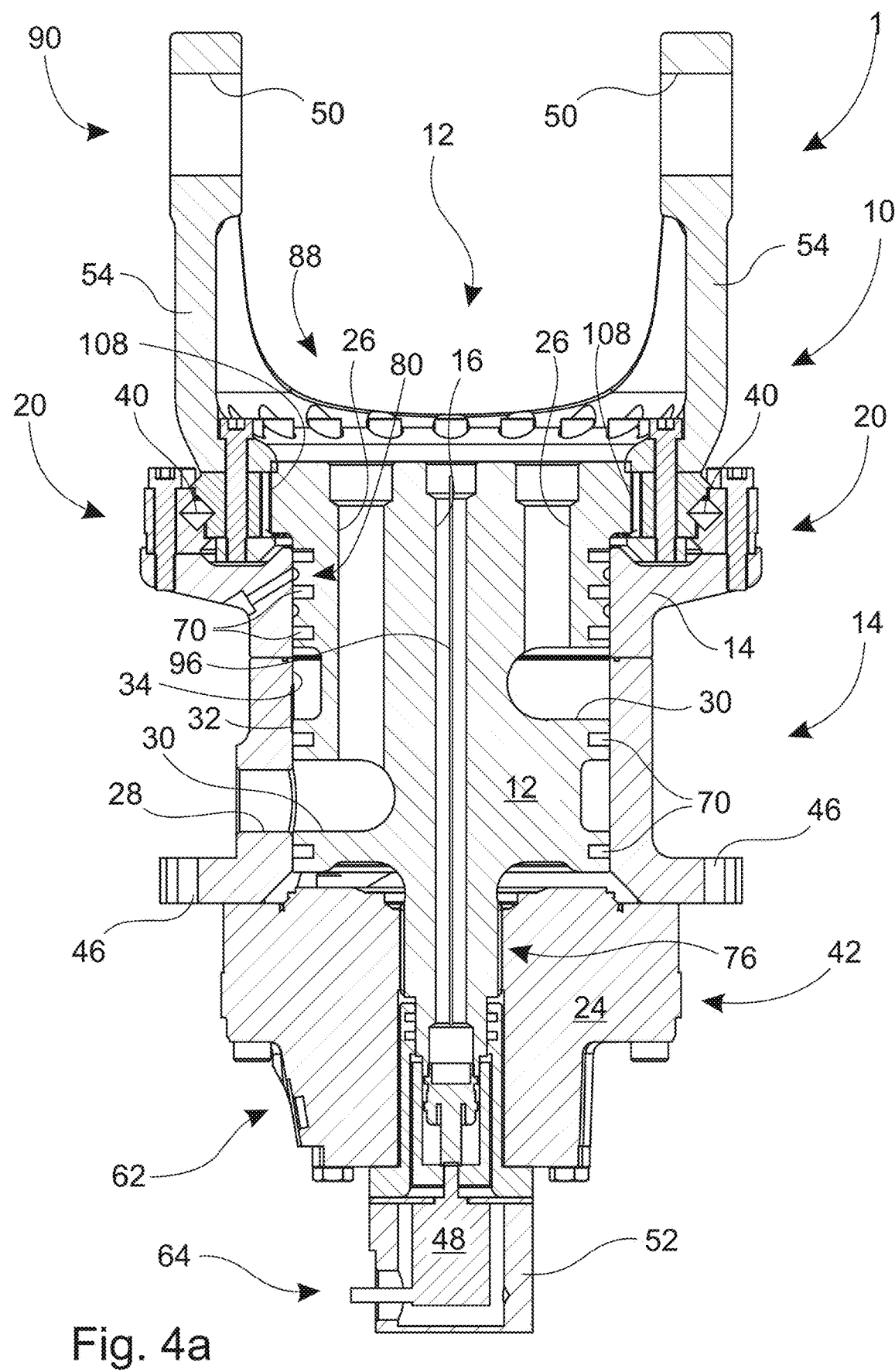
FIG. 4a shows a side cross-section of a second embodiment of the structure and rotation device according to the invention.
Figure 4B:
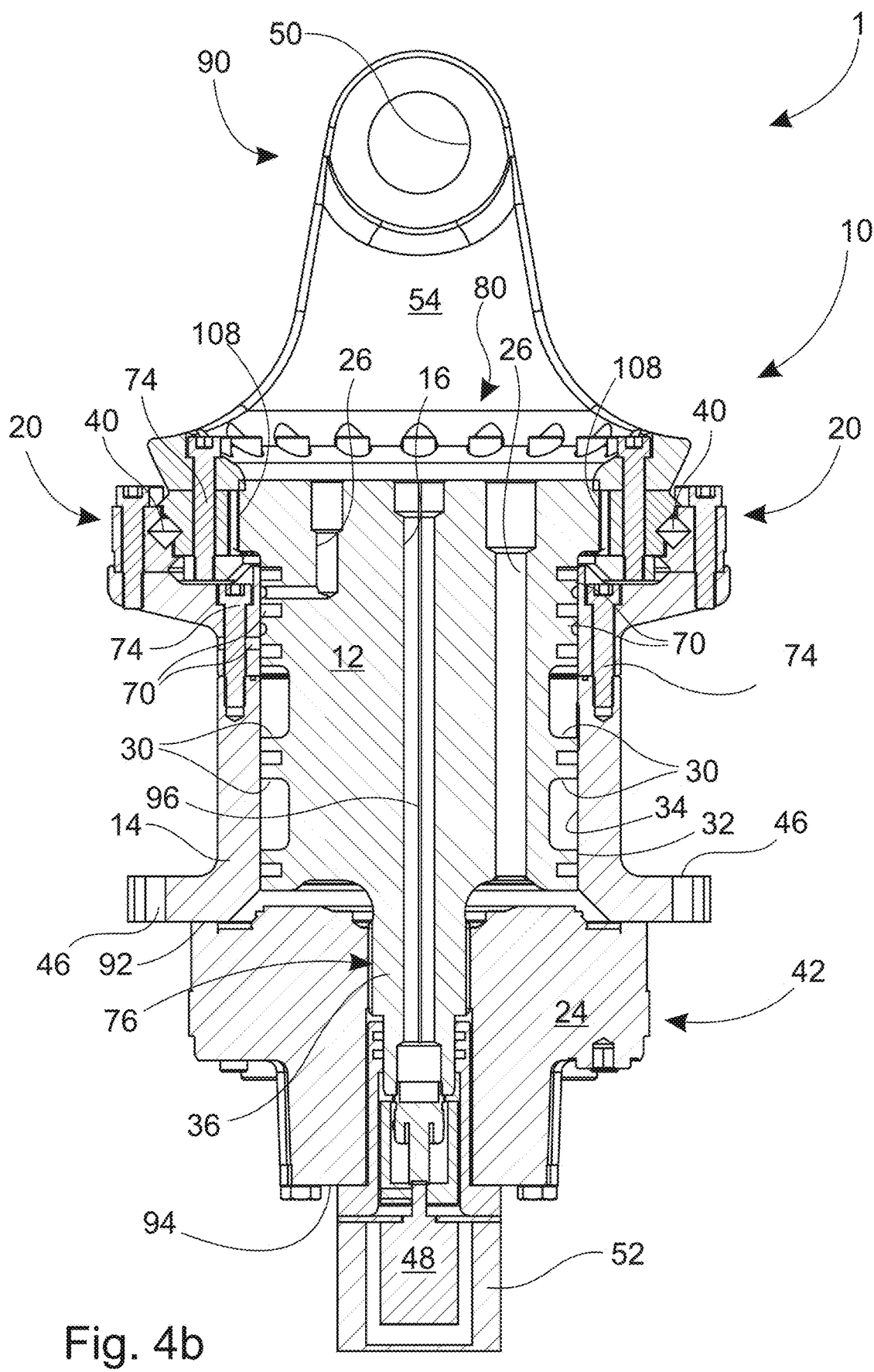
FIG. 4b shows a side cross-section at an angle of 90° relative to FIG. 4a of a second embodiment of the structure and rotation device according to the invention.

In the embodiment according to FIGS. 3*a* and 3*b*, in which the sleeve shaft 36 is a separate part of the inner body part 12, one of the first conduits 26 can be formed between the sleeve shaft 36 and the inner body part 12, coaxially around the sleeve shaft 36. In other words, an empty space 38 remains between the sleeve shaft 36 and the inner body part 12, along which the drainage of the pressure-medium flow from both the turning device 24 and the harvester head can be taken through the rotation device 1. The empty space 38 may be part of a drainage line 60.3 identified in FIG. 3*b* and further described below in connection with FIGS. 5 and 6. The use of one extra conduit and two rotating movement seals in the structure is then then avoided.

Figure 5:
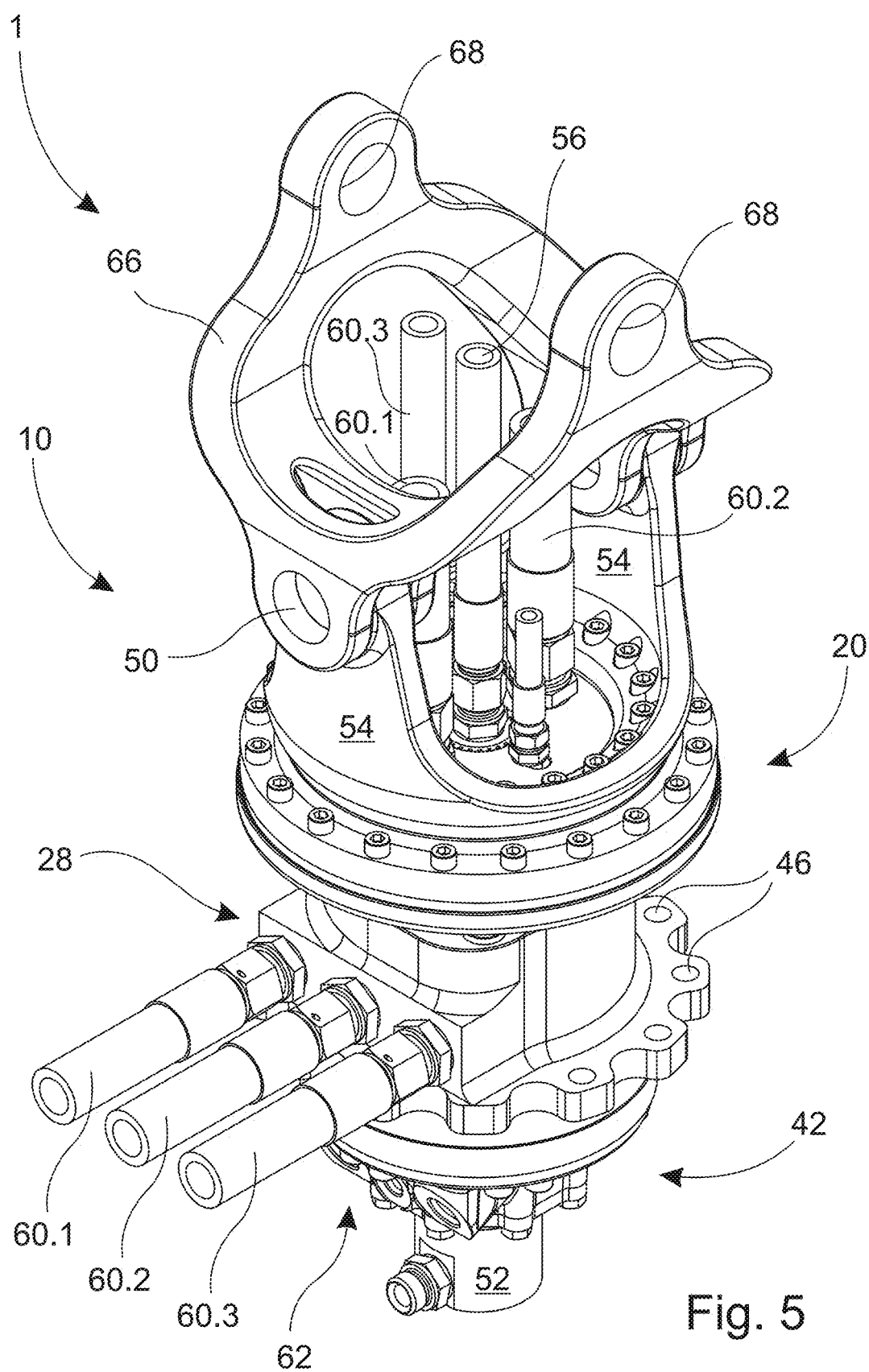
FIG. 5 shows an axonometric view of the separated rotation device according to the invention.

FIG. 5 shows the rotation device 1 according to the invention separated from a forest machine. In the figure, the pressure-medium lines 60.1, 60.2, and 60.3 going to the harvester head are connected to the connectors 28. Of these, pressure-medium line 60.1 is preferably the pressure line, 60.2 the return line, and 60.3 the drainage line. Connections 62, with the aid of which the pressure-medium flow is led from the harvester head to the turning device 24, can be seen under the pressure-medium limes 60.1, 60.2, and 60.3. Reference number 46 marks the holes, through which the rotation device 1 can be bolted to the shackle 5 of the harvester head 3 according to FIGS. 1 and 2. In FIG. 5, the electric conductors are shown by reference number 56. The hose 82 is, in turn, a tree-stump treatment prevention agent line arranged as additional fluid.

Figure 6:
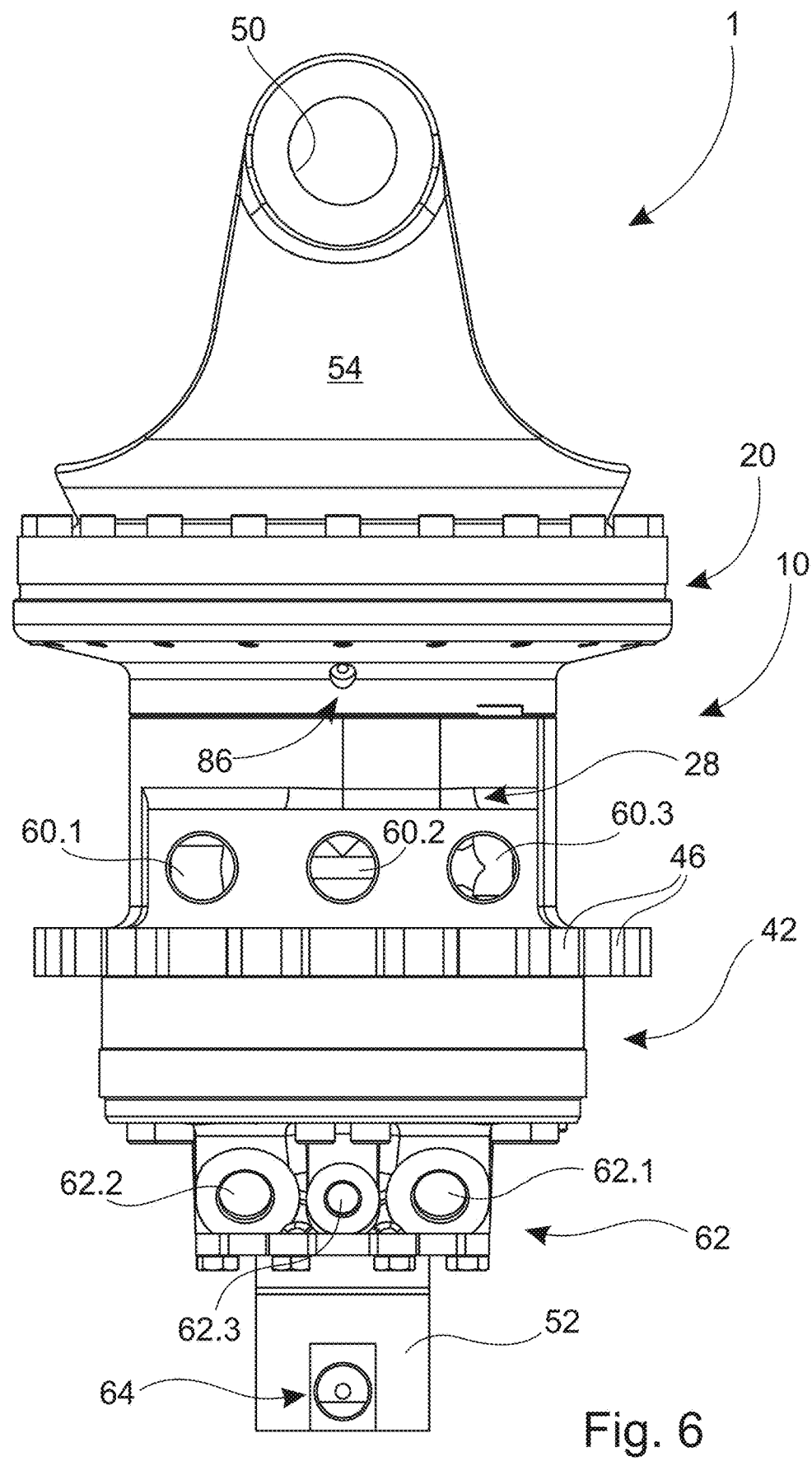
FIG. 6 shows a side view from the same direction as FIGS. 3b and 4b of the separated rotation device according to the invention.

FIG. 6 shows in greater detail the connectors 28, to which the pressure-medium lines 60.1, 60.2, and 60.3 of FIG. 5 are connected. The connectors 62 of the turning device 24 can be seen from Figure to which connectors the pressure-medium lines 62.1-62.3 according to FIG. 2, of which the pressure-medium lines 62.1 and 62.2 are the pressure line and the return line and the middle pressure-medium line 62.3 is a drainage line. Reference number 86 shows the prevention-agent line connector.

Figure 7:
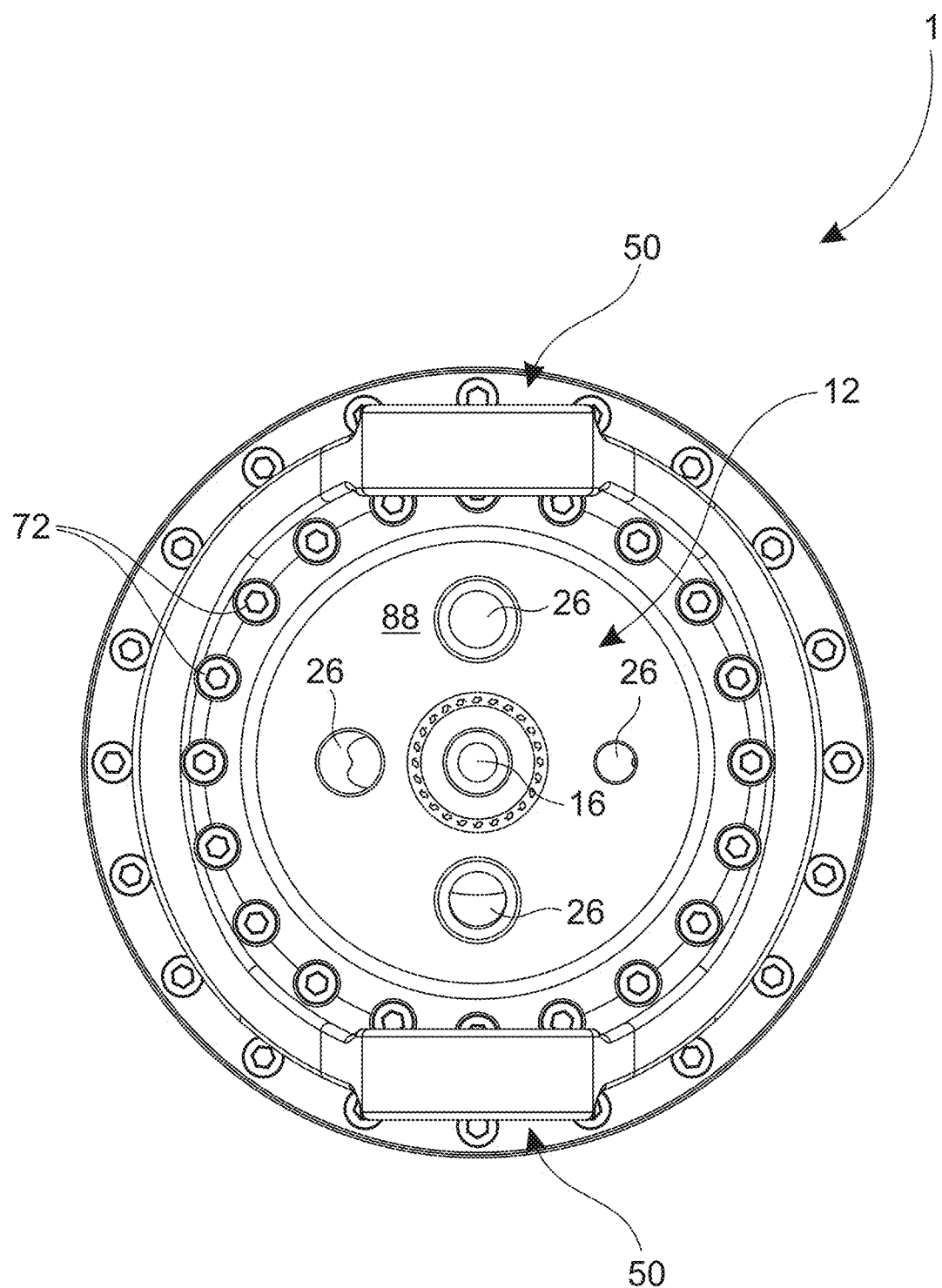
FIG. 7 shows a top view of the separated rotation device according to the invention.

FIG. 7 shows a top view of the rotation device 1 according to the invention. In this embodiment, connectors for the first conduits 26 and the axial conduit 16 are formed in the cover 88 belonging to the rotation device 1. Here the first conduit 26 with a smaller diameter on the right-hand side of the axial conduit 16 is the prevention-agent line. In turn, the connector underneath the axial conduit 16 in the figure is the pressure-medium flow pressure line, the upper connector is the return line, and the connector on the left-hand side is the drainage line. It should, however, be understood that the different first conduits can be used for different purposes, i.e. the pressure line, return line, and drainage line can be in different sequences.

Figure 8:
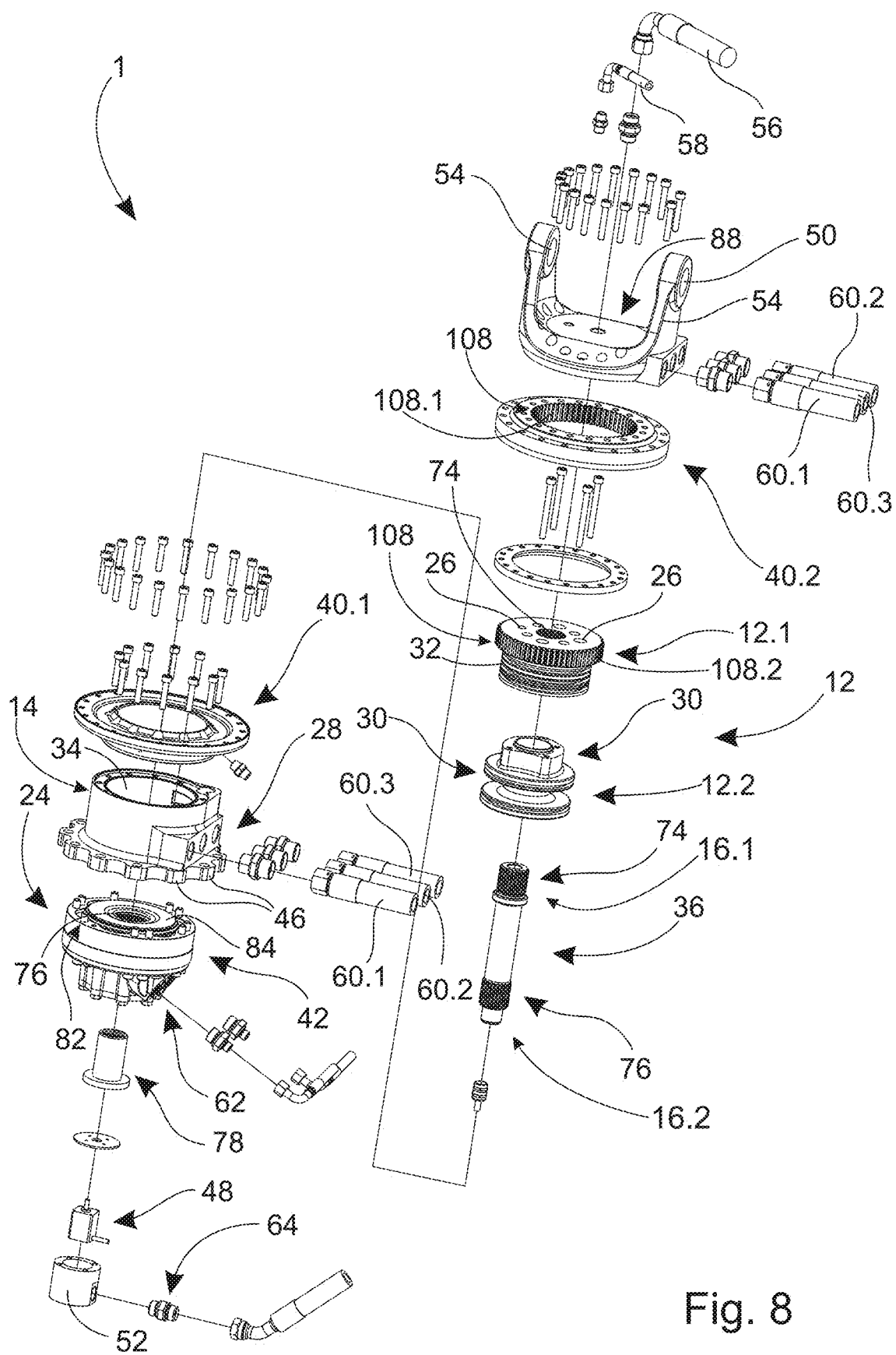
FIG. 8 shows an axonometric exploded view of a third embodiment of the rotation device and structure of the rotation device according to the invention.

FIG. 8 shows an exploded view of the rotation device 1 according to the invention. According to FIG. 8, the inner body part 12 preferably consists of two parts 12.1 and 12.2, of which, in this embodiment, part 12.1 includes the first conduits 26 and the second part 12.2 the second conduits 30. According to FIG. 8, the rotation device 1 also includes a cover 88, which can be attached to the inner body part 12. In the third embodiment of the rotation device 1 and the structure 10 of the rotation device of FIG. 8 continuation conduits are formed in the cover 88 as continuations of the first conduits 26, which turn connectors for the hoses of the pressure-medium flow by essentially 90° relative to the orientation of the first conduits. Thus the hoses leave the cover 88 of the rotation device 1 sideways, unlike in the embodiments of FIGS. 1-7. According to FIG. 8, several parts are attached to each other with the aid of bolts or other locking means, so that the rotation device can be dismantled when necessary. In FIG. 8, an inner part and outer part of the ring bearing 40 are shown by the reference numbers 40.1 and 40.2.

Differing from the embodiments of FIGS. 1-9, the rotation device according to the invention can also be manufactured in such a way that the outer body part of the structure of the rotation device is attached to lugs and through them to the boom, whereas the harvester head is attached to the inner body part.

Figure 10:
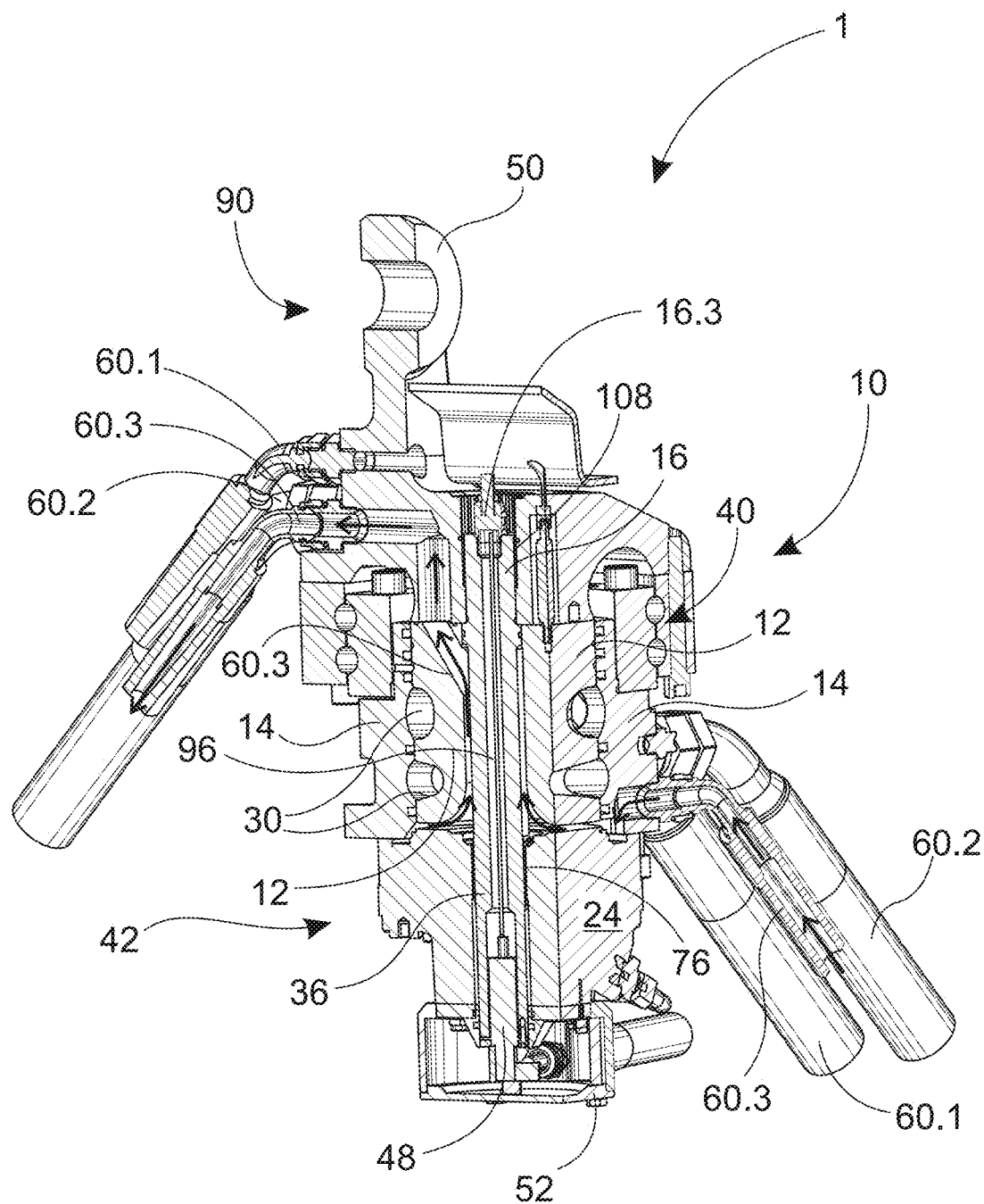
FIG. 10 shows an axonometric exploded view of a fourth embodiment of the rotation device and structure of the rotation device according to the invention.
Figure 11:
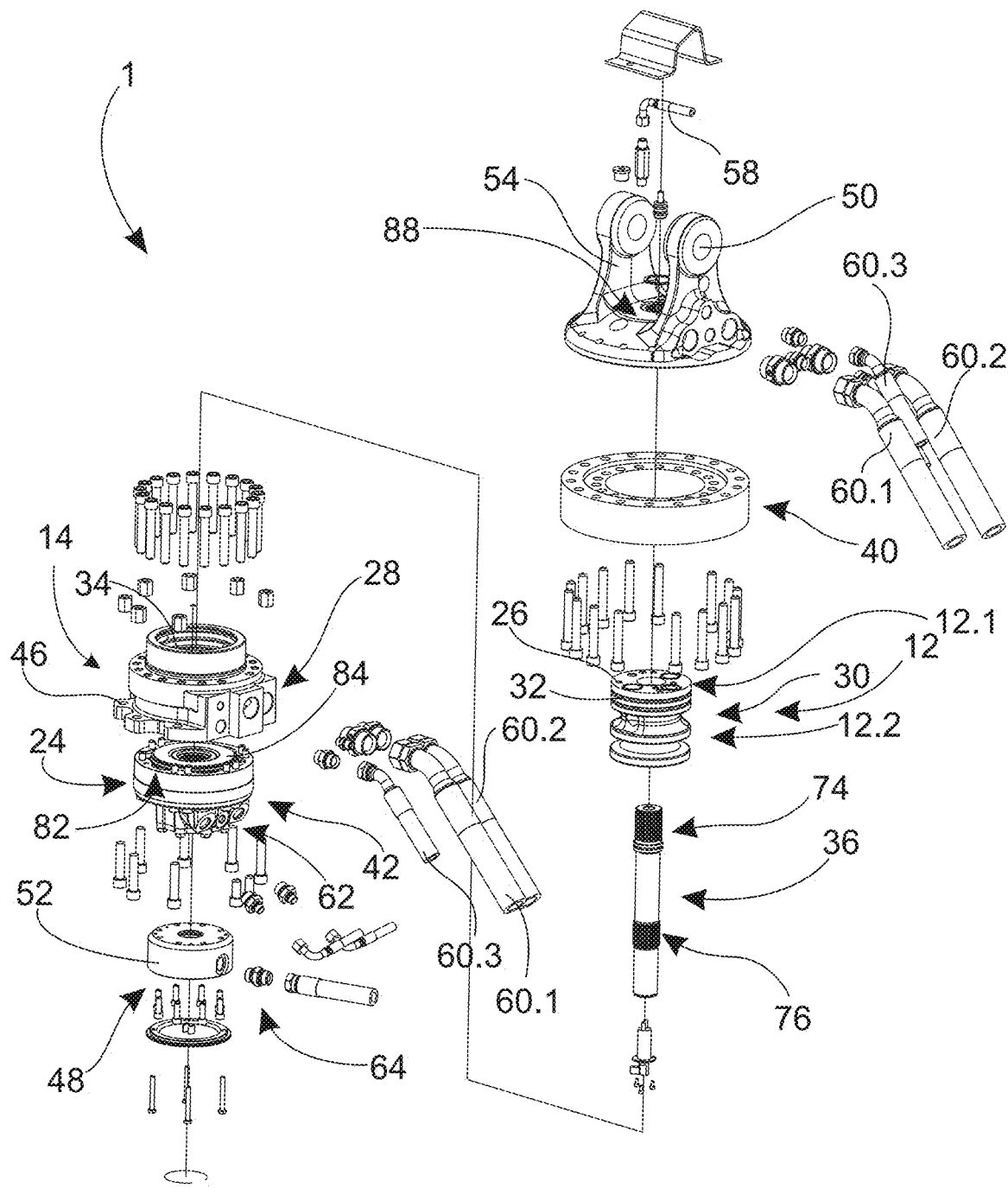
FIG. 11 shows a partially exploded side cross-section of a first embodiment of the structure and rotation device according to the invention, when mutually connected parts are shown together as blocks.

FIGS. 10 and 11 show a body structure of a rotation device which is not a part of the invention. Here, unlike in the present invention, the inner body part 12 is a unified piece and does not comprise two parts 12.1 and 12.2 as in the embodiment of FIG. 8. The locations of the pressure line 60.1, the return line 60.2, and the drainage line 60.3 are altered in the rotation device of FIG. 10 relative to the embodiment of FIG. 8. According to FIG. 10, the drainage line 60.3 is formed between the inner body part 12 and the axial conduit 16. FIG. 10 shows the cable input holder 16.3 and the electric conductors (cable) 96.

The rotation device and rotation-device structure according to the invention are, except for the various seals, preferably manufactured from steel or some similar material suitable for the purpose. The axial height of the axial conduit of the rotation device according to the invention can be 300-800 mm and its diameter 200-400 mm, preferably 250-350 mm. The weight of the rotation device can be in the order of 50-200 kg, preferably 100-150 kg, for an optimal power-weight ratio. The bearings used can be, in an as such known manner, preferably rolling bearings, such as needle, ball, roller, or conical-roller bearings, or more preferably ring bearings. On the other hand, the bearings can also be sliding bearings, when they will carry the same loadings as a ring bearing, and when the material can be bearing bronze, brass, or some polymer.

A variation of the solutions shown in FIGS. 3a-4b (not according to the invention) could be such, in which neither the central conduit not the adapter permitting rotation would be needed at all, as the electrical energy required is produced in the harvester and the data traffic is arranged wirelessly to the harvester head from suspension device or directly from the base machine. It is also possible to move the adapter permitting rotation to above the rotation device, which is, however, difficult if it is wished to use standard-type components.

FIG. 9 shows a partial exploded side cross-section view of the structure according to FIG. 3a with mutually connected parts shown together. Basically the structure consist of three part A, B and C moving in relation to each other. Part A comprises the suspension part 90, part B the inner body part 12 and the axial conduit 16, and part C the outer body part 14 and the adapter 48 for the electric conductors. The suspension part 90 is connected to the bearing 20, namely inner part 20.1 of the ring bearing 40 and the second part 40.2 of the ring bearing 40 is connected to the outer body part 14. In this embodiment the turning device 24 is arranged to be connected to the outer body part 14. The inner body part 12 is installed inside the outer body part 14 and the suspension part 90 and on top of the turning device 24. The inner body part 12 is not fixedly connected to any of the previous mentioned parts but is freely movable in the direction of the axial conduit 16.

When the turning device 24 rotates the outer body part 14, it transmits torque to the inner body part 12 via first fluting 76 which is a power transmission means formed to the second end of the axial conduit 16 fixedly attached to the inner body part 12. In this embodiment there can be a second fluting 74 between the inner body part 12 and the wall of axial conduit 16 to transmit torque. The inner body part 12 then transmits torque to the suspension part 90 via third fluting 108 situated between the inner body part 12 and the suspension part 90 or the inner part 40.1 of bearing 20 attached to the suspension part 90. The outer part 108.1 and the inner part 108.2 of the third fluting 108 can be seen also in FIG. 8. Preferably there is also a small amount of radial play in the third fluting to enable the inner body part 12 to be in slight angle in relation to vertical axis in the rotation device's operating position. The adapter 48 is attached to the turning device 24. Instead of term "fluting" a term "spline" can also be used.

From FIG. 9 it can be seen that the inner body part 12 includes a radial extension 112 protruding from the inner body part 12 and the suspension part 90 further includes a support surface 114 for supporting the inner body part 12 from the radial extension 112 on the support surface 114. The support surface 114 can be a flange. Preferably there is also a second flange placed a distance apart from the flange forming the support surface and the radial extension 112 is between the flange and the second flange.

Preferably the axial conduit 16 is fixed to the inner body part 12 wherein the second end 16.2 of the axial conduit 16 forms a power transmission shaft 118 extending from the inner body part 12 for transmitting torque between the inner body part 12 and the turning device 24 arranged to be attached to the structure 10.

The invention claimed is:

1. A rotation device arrangement, comprising:
   a rotation device including a structure having an axis of rotation;
   a suspension part for suspending the structure of the rotation device from a boom;
   the structure of the rotation device including:
      an inner body part including first conduits passing through the inner body part for leading a pressure medium through the inner body part;
      an outer body part arranged at least partly around the inner body part for being rotatable without limitation relative to the inner body part, wherein the outer body part includes connections for leading the pressure medium from the inner body part through the outer body part;
      second conduits disposed in at least one of an outer surface belonging to the inner body part and an inner surface belonging to the outer body part for leading the pressure medium in all attitudes of the inner body part relative to the outer body part from the first conduits to the connections of the outer body part;
      a bearing arranged to permit the outer body part to rotate relative to the inner body part and vice versa, which bearing is arranged to carry loads both axially and radially with respect to an axis of rotation of the rotation device;
      attachment parts for attaching a direct-drive pressure-medium operated turning device underneath and to the structure coaxially relative to an axis of rotation between the inner body part and the outer body part that is coaxial with the axis of rotation of the rotation device, to transmit torque from the turning device to the structure; and
      an axial conduit disposed coaxially with the axis of rotation of the rotation device and comprising a first end and a second end, the axial conduit extending from the suspension part through the structure for carrying electric conductors through the inner body part, wherein the inner body part is arranged to be a floating structure in the axial direction of the axial conduit that transmits torque only around the axial conduit.

2. The rotation device arrangement according to claim 1, wherein the suspension part is attached to the outer body part with aid of the bearing.

3. The rotation device arrangement according to claim 1, wherein the axial conduit comprises a separate sleeve shaft within the inner body part for carrying the electrical conductors through the inner body part.

4. The rotation device arrangement according to claim 1, wherein the structure comprises an additional conduit for leading fluid through the structure.

5. The rotation device arrangement according to claim 1, wherein the attachment parts are arranged to attach the turning device to an undersurface of the outer body part.

6. The rotation device arrangement according to claim 1, wherein the bearing is a ring bearing fitted between the inner body part and the outer body part.

7. The rotation device arrangement according to claim 1, comprising at least three sets, each set comprising one of the first conduits, one of the connections, and one of the second conduits, wherein the three sets respectively comprise a pressure line, a return line, and a drainage line for a flow of the pressure-medium.

8. The rotation device arrangement according to claim 1, wherein the axial conduit constitutes an integrated part of the inner body part.

9. The rotation device arrangement according to claim 1, comprising a drainage line arranged around the axial conduit for guiding leaks from both the pressure-medium operated turning device and operating devices of a harvester head back towards the boom through the structure of the rotation device.

10. The rotation device arrangement according to claim 3, wherein the second end of the sleeve shaft comprises a first fluting for transmitting torque in a direction around the axial conduit and permitting the motion in the direction of the axial conduit between the inner body part and the turning device.

11. The rotation device arrangement according to claim 10, wherein the structure comprises a second fluting on the sleeve shaft for transmitting torque around the axial conduit and for permitting motion in the direction of the axial conduit between the inner body part and the suspension part.

12. The rotation device arrangement according to claim 1, wherein the inner body part includes a radial extension protruding from the inner body part and the suspension part further includes a support surface for supporting the inner body part from the radial extension on the support surface.

13. The rotation device arrangement according to claim 1, wherein the connections of the outer body part are arranged to lead the pressure medium through the outer body part in a radial direction with respect to the axis of rotation of the rotation device.

14. The rotation device arrangement according to claim 1, wherein the inner body part has an integral central portion that defines the axial conduit, and the second end of the axial conduit comprises a power transmission shaft extending from the inner body part for transmitting torque between the inner body part and the turning device when the turning device is arranged to be attached to the structure.

15. The rotation device arrangement according to claim 1, further comprising: the direct-drive pressure medium operated turning device attached by the attachment parts to the structure coaxially relative the axis of rotation of the rotation device; and an adapter for permitting a complete rotation of electric conductors and being attached to an under-surface belonging to the turning device in an operating attitude of the rotation device.

16. The rotation device arrangement according to claim 15, wherein the pressure-medium operated turning device is a radial piston motor.

17. The rotation device arrangement according to claim 15, comprising a hydraulic drainage line arranged between the structure and the turning device for connecting and leading a hydraulic leakage flow coming from a work device to the hydraulic drainage line.

18. The rotation device arrangement according to claim 15, wherein the turning device is attached, in an operating attitude of the rotation device underneath the outer body part, to an under-surface belonging to the outer body part.

19. A forest machine comprising the rotation device arrangement according to claim 1.

20. The forest machine according to claim 19, comprising a harvester head.

* * * * *